(12) United States Patent
Wiebe

(10) Patent No.: US 8,740,532 B2
(45) Date of Patent: Jun. 3, 2014

(54) STUD FASTENERS FOR FASTENING A CYLINDER HEAD TO AN ENGINE BLOCK AND KIT CONTAINING SAID STUD FASTENERS

(76) Inventor: Jacob Wiebe, Altona (CA)

( * ) Notice: Subject to any disclaimer, the term of this patent is extended or adjusted under 35 U.S.C. 154(b) by 716 days.

(21) Appl. No.: 12/952,786

(22) Filed: Nov. 23, 2010

(65) Prior Publication Data

US 2011/0126792 A1    Jun. 2, 2011

Related U.S. Application Data

(60) Provisional application No. 61/265,033, filed on Nov. 30, 2009.

(51) Int. Cl.
*F16B 35/00* (2006.01)

(52) U.S. Cl.
CPC .................................. *F16B 35/00* (2013.01)
USPC ....................................................... 411/389

(58) Field of Classification Search
USPC .......... 411/389, 412, 413, 914, 388, 400, 401
See application file for complete search history.

(56) References Cited

U.S. PATENT DOCUMENTS

| | | | |
|---|---|---|---|
| D31,685 S * | 10/1899 | Spear | D8/387 |
| 3,320,940 A | 5/1967 | Mitchell et.al. | |
| 3,455,198 A * | 7/1969 | Barrett | 411/388 |
| 3,842,718 A * | 10/1974 | Malchow | 92/171.1 |
| 3,983,304 A * | 9/1976 | Sekhon | 411/504 |
| 4,376,332 A * | 3/1983 | Sandefur | 29/402.08 |
| 4,673,323 A * | 6/1987 | Russo | 411/107 |
| 4,977,799 A | 12/1990 | Yasutomi | |
| 5,025,556 A | 6/1991 | Stafford | |
| 5,071,301 A * | 12/1991 | Engelhardt et al. | 411/389 |
| 5,379,505 A | 1/1995 | Reed | |
| 5,513,545 A * | 5/1996 | George | 81/53.2 |
| 5,944,303 A | 8/1999 | Reed | |
| 7,448,355 B2 * | 11/2008 | Haze et al. | 123/195 R |

OTHER PUBLICATIONS

Design Procedures for Automotive Bolts, ARP, webpage, 1 page, http://www.arp-bolts.com/pages/technical_design.shtml.

* cited by examiner

*Primary Examiner* — Flemming Saether
(74) *Attorney, Agent, or Firm* — Tracy Jong Law Firm; Tracy P. Jong; Louis Reale

(57) ABSTRACT

The present invention relates generally to fastening systems, and more specifically, to high tensile or high strength studs. The studs are adapted to be utilized in original manufacture or in the repair or retrofit of internal combustion engines. The improved stud technology can be utilized in the fabrication of new engine builds to improve reliability, extend product life, and the like. Likewise, the stud technology can be used to repair and/or upgrade a failed, compromised, or questionable cylinder head to engine block fastening system. Additionally, a repair or retrofit a kit can be assembled with the improved studs at its foundation. Optionally, any combination of additional items or components useful in the cylinder head to engine block fastener modification can be added to such a kit.

20 Claims, 12 Drawing Sheets

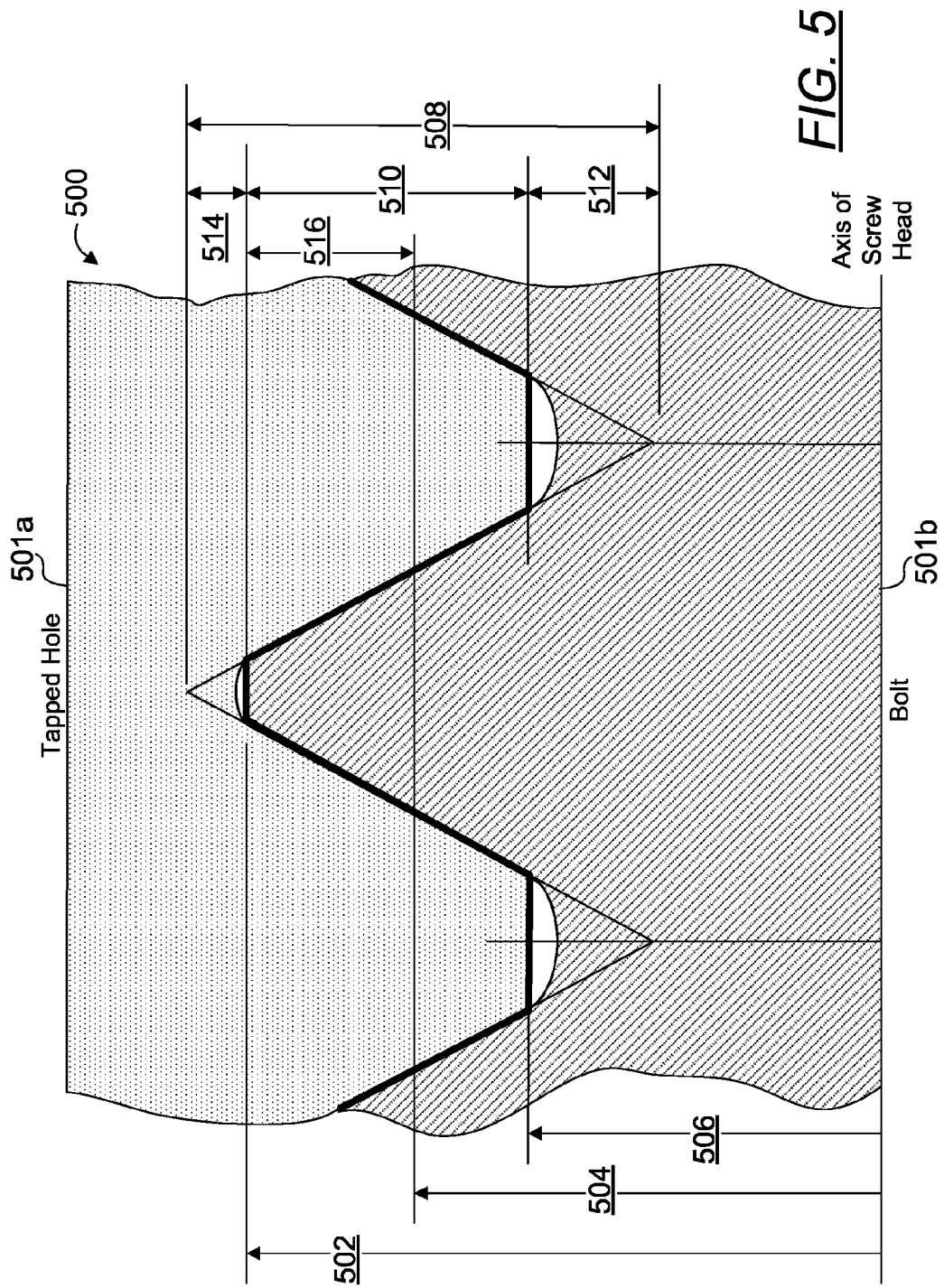

STUD FASTENERS FOR FASTENING A CYLINDER HEAD TO AN ENGINE BLOCK AND KIT CONTAINING SAID STUD FASTENERS

RELATED APPLICATIONS AND PRIORITY CLAIM

This application claims priority to provisional application U.S. Ser. No. 61/265,033 filed Nov. 30, 2009. This application is incorporated by reference herein in its entirety.

FIELD OF THE INVENTION

The present invention relates generally to fastening systems, and more specifically, to high strength studs having dual diameters or having two opposing threaded portions, wherein each threaded portion possesses unequal major diameters. The studs are adapted to be utilized in the repair or retrofit of internal combustion engines in addition to utilization in the original manufacture of internal combustion engines.

BACKGROUND OF THE INVENTION

Simple stud type devices as applied to internal combustion engines have certain known advantages. Nevertheless, there remain voids regarding desirable attributes pertaining to the stud fastening devices, their methods of use, as well as solving and/or overcoming the underlining problems or motive(s) that initially prompted their use.

U.S. Pat. No. 5,025,556 to Stafford is one such example that discloses a method for repairing cylinder head bolt holes located in engine blocks. Stafford discloses a method where a problem cylinder head bolt hole or block hole, located in an engine block, is drilled out, followed by a measuring step to precisely determine the new hole diameter, whereby a custom made stud is created in a subsequent step to precisely fit into the newly created block-hole. The method substantially describes a procedure to create fastening hardware in on-demand, or real-time type of scenario. Such a procedure is not only complex and time consuming, but calls for the use of relatively expensive and complex equipment typically left to specially trained, skilled workers to operate (e.g. a lathe, and the like). The use of an adhesive having a cure time of 12 hours is also included in the repair process. Furthermore, Stafford clearly teaches the application and use of a fine thread (e.g. UNF) types directed to stud or fastener to block-hole interfaces. Unfortunately, fine thread types and corresponding interfaces are more susceptible to cross-threading, have a greater tendency to strip, are more time consuming to install, as well as being more prone to corrosion damage when compared to the coarse thread (e.g. UNC) counterpart. The use of fine thread fastening interfaces, particularly with the more susceptible present day engine blocks fabricated from aluminum based alloys, increase the likelihood of fastener-block interface failure.

Present day cylinder head to engine block bolt type fastener repairs, as well as the teaching of aforementioned U.S. Pat. No. 5,025,556 to Stafford, include the installment of multi-interface coupling devices such as threaded sleeves, threaded plugs, threaded inserts, self-tapping threaded inserts, and the like, into the block-hole. Such multi-interface coupling devices prepare the engine block for receiving the corresponding stud or bolt fastener. The installation of such multi-interface coupling devices can be cumbersome due to the absence of ordinary tool interface features, thereby requiring the use of specialty tools. Furthermore, often such multi-interface coupling devices are prone to premature failure. Such premature failures can be attributed a multitude of causes, including: inherent material weakness involving one or more fastening interface sites, thermal cycling fatigue, coupling device dimensional inadequacies, installation errors, and the like. Additionally, multi-interface coupling devices often exhibit diameter expansion when torque is applied, the strain created has the potential to crack engine blocks as well as strip the sleeve's internal threads.

Overall, a need still exists for a cylinder head to engine block fastening device that is reliable, possesses a long service life, and lends itself to uncomplicated, quick installation. Applications for such an improved fastening device or devices would include: new engine fabrication, retrofitting used engines in need of repair, upgrades, or the like.

The purpose of the present invention is to overcome the long felt need associated with the multitude of shortcomings in the present and aforementioned prior art. Additionally, the present invention includes the introduction of additional novel features giving rise to further advancements resulting in an improved fastening device.

SUMMARY OF THE INVENTION

The present invention relates to high tensile or high strength studs that are adapted to be utilized in the original manufacture or in the repair and/or retrofit of cylinder head-engine block fastener interfaces commonly associated with internal combustion engines. The improved stud device and embodiments provides numerous advantages, which include: increased engine robustness and reliability associated with cylinder head-engine block interface portion of internal combustion engines. Additionally, an installation, repair or retrofit kit is the topic of an alternate embodiment that includes the appropriate number of improved studs for a given application. More comprehensive kits allow the introduction of any combination of additional items or components useful in the attachment of a cylinder head to engine block, so to streamline the fastening process.

It is understood that the use of the improved stud technology directed to the cylinder head-engine block application is considered one of many exemplary applications; other engine block based issues can be solved by use of this fastening technology. For example, the repair of oil filter mounts where the engine block bolt holes associated with the oil filter become stripped or damaged and require repair; such occurrences can occur quite easily with aluminum block engine types.

It is an object of the present invention to provide a pre-manufactured improved stud fastener or fasteners, adapted for a specific engine make, model, type, or style, for reliably securing a cylinder head to an engine block that ensures relatively simple and trouble-free installation on new engine builds as well as on pre-existing or used engines requiring repair, retrofitting, or the like. The availability of the pre-manufactured improved stud fasteners includes: individual units, a complete set given a specific engine, or in a kit type format that further comprises useful installation components.

It is another object of the present invention to provide an improved stud fastener where each end is optimized to corresponding interfaces as well as adapted to the specific engine geometry of interest, e.g. an engine block threaded hole, cylinder head nuts, cylinder head apertures, internal cylinder head fastener pathway, and the like.

It is yet another object of the present invention to provide an improved stud fastener with features that help compensate for the less desirable material properties associated with aluminum or aluminum alloy engine blocks. Such features include the use of enlarged engine block threaded holes, the use of coarse thread (e.g. UNC standard) on engine block-stud interfaces that possess increased thread depths resulting in improved reliability, strength, and the like.

It is an object of the present invention to provide a pre-manufactured improved stud fastener that includes an integrated cylindrical locating or alignment feature to quickly and accurately position cylinder heads onto the engine block. The original alignment feature provided with an engine block is typically a press-fit bushing disposed in the corner located engine block holes dedicated to cylinder head fastening. The improved stud fastener possessing the integrated cylindrical alignment feature will replace the press-fit bushing feature since the press-fit bushings are typically removed when performing a cylinder head to engine block repair or retrofit.

It is another object of the present invention to provide an improved stud fastener where the first end or the cylinder head end of the stud possesses at least two flat portions to aid in installation. The features are preferably located on the tip of portion of the cylinder head end side of the stud fastener. Since machining flats, and the like, can alter the mechanical strength of a component, the installation feature is preferably disposed on a non-critical or non-stressed portion of the improved stud fastener (e.g. cylinder end side or first end) when the device is functionally installed. Such a prehensile feature will provide a user with the option to use a fastening tool such as an adjustable wrench, or the like, to assist in the stud installation.

It is yet another object of the present invention to provide a plurality of improved stud fasteners in a kit type format including additional components that are required or useful in the installation process. Additional components include: engine block aligning plate, instructions, a tap, drill bit, nuts, washers, and the like.

It is an object of the present invention to provide a one-piece repair scheme using the improved stud fastener, as opposed to using a dual interface coupling device (e.g. threaded sleeve) and an original style bolt. By employing the one-piece repair operation, the user eliminates the risk of cracking the engine block, and thread stripping associated with threaded sleeve diameter expansion during the torquing process. Additionally, the improved stud fasteners, due to their elongated geometry, can often be installed into an engine block by hand, thereby streamlining the installation process.

The aforementioned objects are not intended to be exhaustive; other obvious objects of the present invention will be portrayed in the disclosure hereinafter. Whereas there may be many embodiments of the present invention, each embodiment may meet one or more of the foregoing recited objects in any combination. It is not intended that each embodiment will necessarily meet each objective.

Thus, having broadly outlined the more important features of the present invention in order that the detailed description thereof may be better understood, and that the present contribution to the art may be better appreciated, there are, of course, additional features of the present invention that will be described herein and will form a part of the subject matter of the claim(s) appended to this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways As such, those skilled in the art will appreciate that the conception, upon which this disclosure is based, may readily be utilized as a basis for the designing of other structures, methods and systems for carrying out the several purposes of the present invention. It is important, therefore, that the description be regarded as including such equivalent construction insofar as they do not depart from the spirit and scope of the conception regarded as the present invention.

Particular Advantages of the Invention

The improved stud technology can be utilized in the fabrication of new engine builds to improve reliability, extend product life, and the like. Likewise, the stud technology can be used to repair or upgrade a cylinder head to engine block fastening system.

Additionally, an installation, repair or retrofit kit containing the improved studs provides a convenient means for organizing the desired components for a specific make and model vehicle. It is understood that a variety of stud kits can be assembled having any combination of additional items or components useful in the cylinder head to engine block fastener improved stud installation process.

Furthermore, the larger diameter and deeper thread when utilized in the stud-engine block interface is of particular value when working with the increasingly popular, modern aluminum alloy engine blocks. This is due, in part, to the aluminum alloys (e.g. A356, 242, 319) used in engine block fabrication, being inherently weaker and more susceptible to damage and corrosion than the heavier, cast iron and other ferrous alloy based engine blocks.

BRIEF DESCRIPTION OF THE DRAWINGS

The invention will be described by reference to the specification and the drawings, in which like numerals refer to like elements, and wherein:

FIG. 5 illustrates details and defining aspects of a typical threaded fastener/fastening interface.

Figure 1:
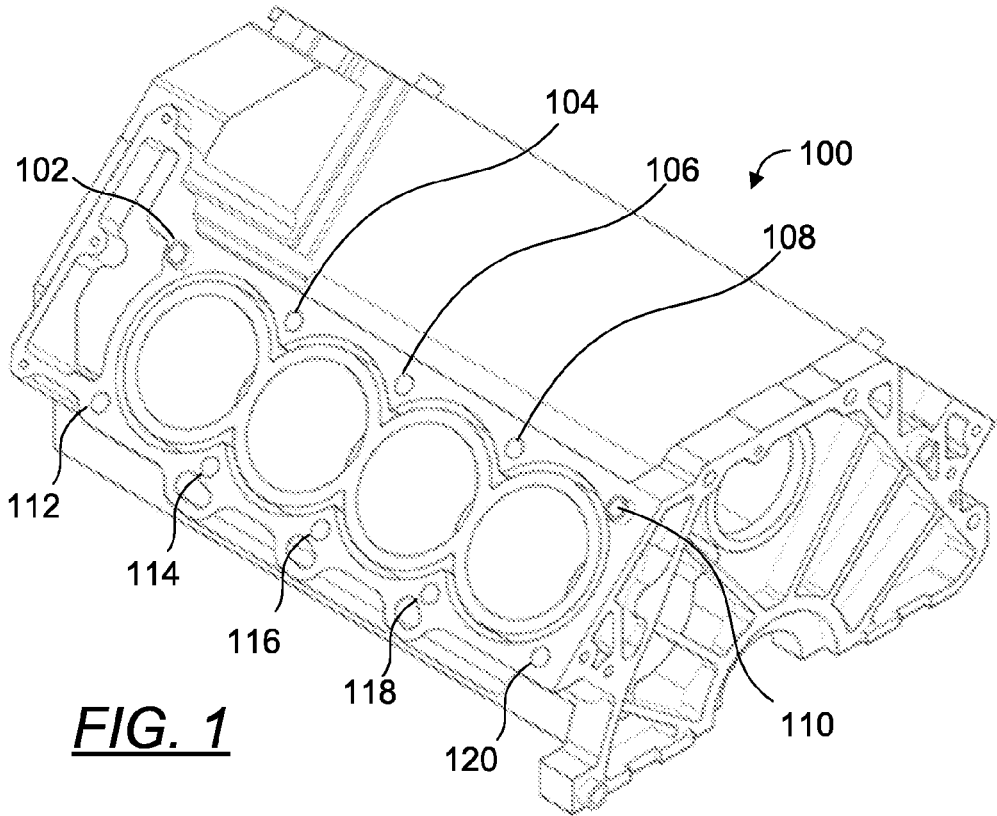
FIG. 1 illustrates a top perspective view of an exemplary unmodified engine block in accordance with a typical engine block design.

The drawings are not to scale, in fact, some aspects have been emphasized for a better illustration and understanding of the written description.

In order to help facilitate the understanding of this disclosure, a parts/features list numbering convention has been employed. The first digit in three digit part numbers refers to the Figure number and/or Figure number family where the part was first introduced, or is best depicted. Likewise, in four digit part numbers, the first two digits refer to the Figure number where the part was first introduced, or is best depicted. Although this disclosure may at times deviate from this convention, it is the intention of this numbering convention to assist in an expeditious comprehension of the present invention.

PARTS/FEATURES LIST 100. unmodified engine block
102, 110: tapped hole with alignment bushing
104, 106, 108, 112, 114, 116, 118, 120: tapped hole
130. tapped hole with alignment bushing (sectional view)
132. alignment pin or alignment bushing
134. alignment bushing contact height
136. unmodified internal thread
136a. unthreaded portion of tapped hole
138. functional depth of unmodified hole
138a. thread length
140. tapped hole size or diameter
150. sectional view of tapped hole
156. unmodified internal thread
158. functional depth of unmodified hole
160. tapped hole size or diameter
200. modified engine block
202, 210: tapped-alignment hole
204, 206, 208, 212, 214, 216, 218, 220: modified tapped hole
230. modified tapped-alignment hole (sectional view)
232. unthreaded internal area
236. modified internal thread
238. functional depth of modified hole
238a. thread length
238b. unthreaded internal area depth
240. modified tapped hole size
250. modified tapped hole sectional view
256. modified internal thread
258. functional depth of modified hole
260. modified tapped hole size
300. stud fastener
302. first end or cylinder head end
304. midsection
306. second end or engine block end
312. second threaded feature
314. second threaded feature length
314a. second diameter or second end diameter
316. midsection diameter
318. first threaded feature length
318a. first diameter or first end diameter
320. first threaded feature
322. overall length (stud fastener)
330. stud fastener with tool interface
332. first end, (stud fastener with tool interface)
332a. first flat feature
332b. second flat feature
334. non-continuous threaded section
336. first and second flat feature length
338. distance from first to second flat feature
400. stud-alignment fastener
402. first end or cylinder head end
404. midsection
406. second end or engine block end
406a. second end threaded portion
406b. second end non-threaded portion or alignment feature (for cylinder head)
406c. non-threaded second diameter
412. second end threaded feature
412a. threaded second diameter
414. second end length
414a. threaded portion length (second end)
414b. non-threaded portion length (second end)
416. midsection diameter
418. first threaded feature length
418a. first diameter
420. first threaded feature
422. stud-alignment fastener overall length
430. stud-alignment fastener with tool interface
432. first end
432a. first flat feature
432b. second flat feature
434. non-continuous threaded section
436. first and second flat feature length 438. distance from first to second flat feature
500. definitional detail of a threaded fastening/fastener interface
501a. tapped hole
501b. bolt, screw, stud, or the like
502. major diameter, Dmaj, (of bolt)
504. effective pitch diameter, Dp, (of bolt)
506. minor diameter, Dmin, (of bolt)
508. thread height, H
510. 5 H/8, actual thread depth
512. H/4
514. H/8
516. 3 H/8
600. combination aligning plate, combo jig, or combo plate
602a. mounting hole
602b. mounting hole
604. drill bit alignment hole
606. tap alignment hole
608a. modified tapped hole bolt
608b. modified tapped hole bolt
610a. unmodified tapped hole bolt
610b. unmodified tapped hole bolt
612. drill bit assembly
612a. drill bit
612b. drill bit collar
614. tap
616. front face
618. back face
620. engine block face
622a through 622j, engine block tapped holes/untapped holes
630. combination aligning plate width
632. combination aligning plate height
634. distance between mounting hole 602b and tap alignment hole 606
636. distance between mounting hole 602a and tap alignment hole 606
638. distance between mounting hole 602b center and right plate edge
640. combination aligning plate thickness
642. height of mounting hole 602b feature
644. tap alignment hole 606 feature diameter
646. tap alignment hole 606 feature end to end height
700. retrofitted engine
702. kit instructions
704. cylinder head washers
706. cylinder head nuts
708. combination aligning plate assemblage
710. thread locker
800. exploded view of retrofitted engine
802. cylinder head or engine cover
804. height of stud 300 above surface of engine block 200
806. height of stud 400 above surface of engine block 200
808. height of stud 330 above surface of engine block 200
810. height of stud 430 above surface of engine block 200
812. stud 400 alignment feature height above engine block 200 surface
814. stud 430 alignment feature height above engine block 200 surface

DEFINITIONS OF TERMS USED IN THIS SPECIFICATION

The improved stud fasteners and stud fasteners components for reliably fastening a cylinder head to an engine block, associated kits, in addition to the various embodiments disclosed, shall have equivalent nomenclature, including: the stud technology, the improved stud, the device, the embodiment, the present invention, or the invention. Additionally, the term "exemplary" shall possess only one meaning in this disclosure; wherein the term "exemplary" shall mean: serving as an example, instance, or illustration.

The discussions in this disclosure refer to the right-handed threading system due to the standard or convention in the art. It is understood that functionally, a left-handed threading system would provide equivalent performance, and therefore it is the intention of the present invention to embrace both convention systems.

The term cylinder head failure shall include any failures caused by the loss of specified fastening torque (required tensile fastening stress) pertaining to any of the cylinder head to engine block fasteners e.g. gasket failure, pressure loss, and the like.

DETAILED DESCRIPTION OF THE INVENTION

The discussion hereafter will primarily focus on an eight cylinder, ninety degree V-block based engine for exemplary purposes only. The intention is to include an exemplary discussion to assist in the understanding of the present invention and not to limit the present invention to any specific engine geometry, or to any single set of dimensional values as it pertains to the present invention. It is understood that the present invention has utility with a multitude of existing engine makes and models, and is expected to cooperate with future engine designs as well.

Furthermore, the discussion will closely examine one face of the V-block engine geometry with the understanding that all discussions equally apply to the substantially identical, mirror image, opposing side.

Figure 1A:
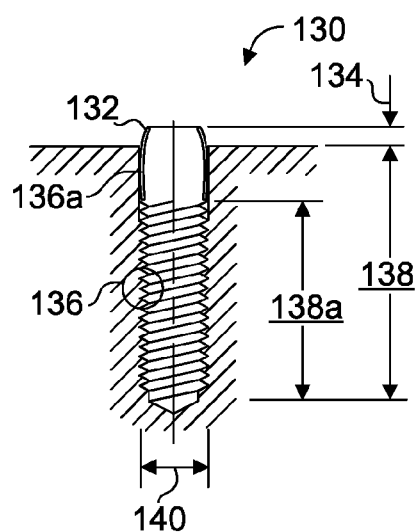
FIG. 1a illustrates a sectional side view of a tapped hole with alignment bushing contained within an unmodified engine block in accordance with a typical engine block design.
Figure 1B:
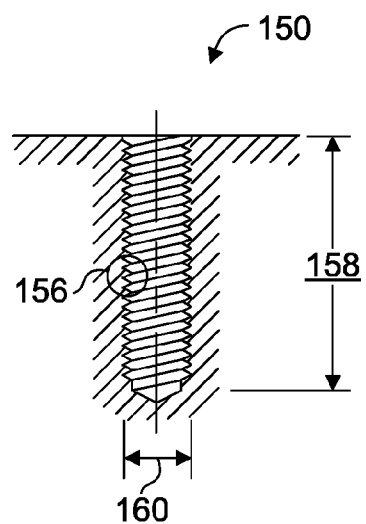
FIG. 1b illustrates a sectional side view of a tapped hole contained within an unmodified engine block in accordance with a typical engine block design.

An exemplary engine system, where one embodiment of the present invention is adapted to, is depicted in FIGS. 1, 1a, and 1b. The figures show various views and aspects of an exemplary unmodified engine block system, more specifically an eight cylinder, Northstar engine, commonly found in certain Cadillac models as well as other automobile types.

Figure 8:
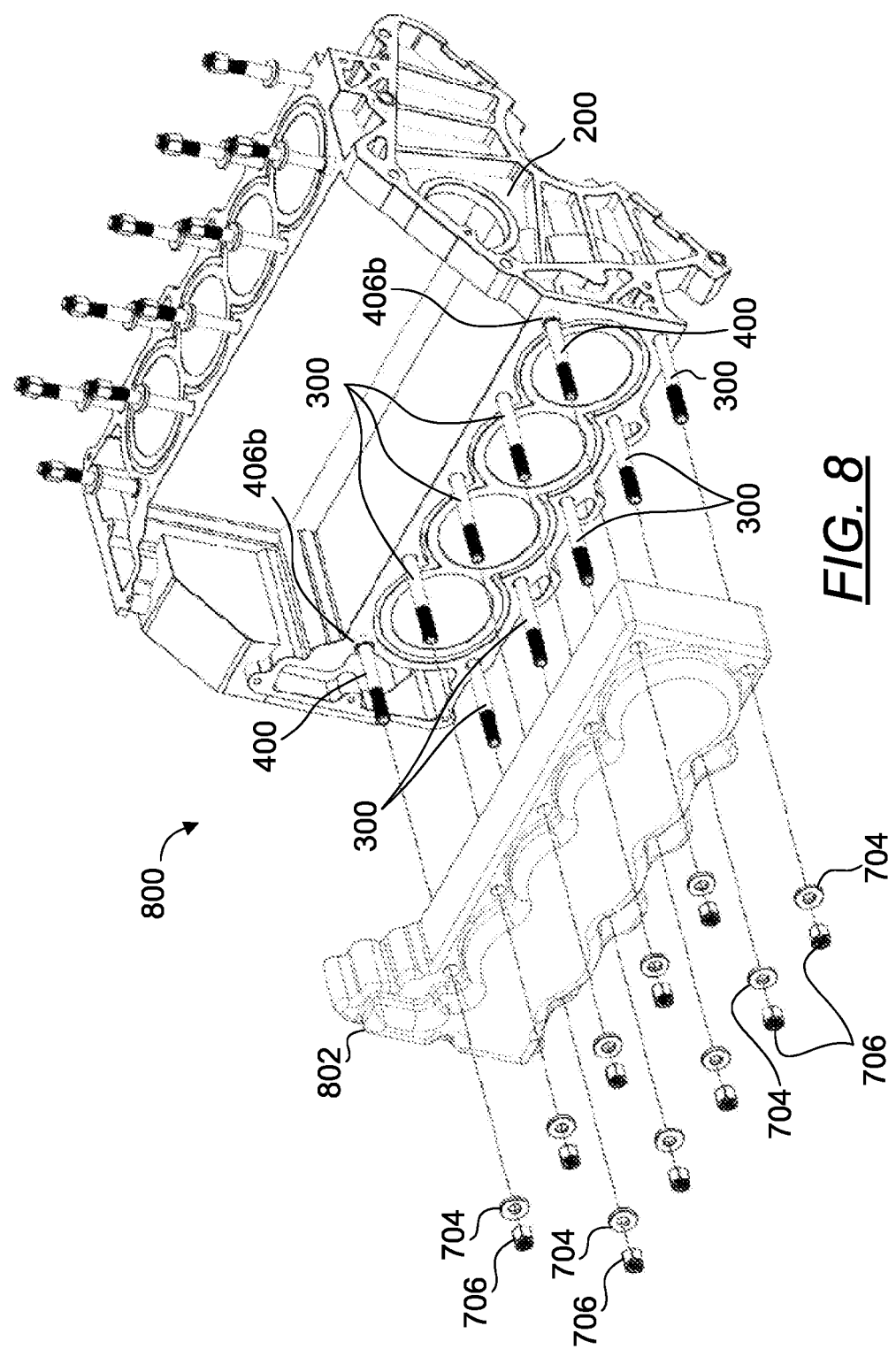
FIG. 8 illustrates a top perspective exploded view of retrofitted engine showing cylinder head, or engine cover and associated fastening components.

Referring to FIG. 1, depicted is unmodified engine block 100 having two tapped holes with alignment bushings 102, 110, and eight tapped holes 104, 106, 108, 112, 114, 116, 118, 120, located on each side of the engine block 100. The tapped holes with alignment bushings 102, 110, are designed to snugly mate with corresponding mating-alignment features located on cylinder head 802 in addition to enabling fastening; this arraignment is best illustrated in FIG. 8. Such cylinder head alignment designs are commonly used in the engine manufacturing industry. The primary function of the aforementioned eight tapped holes (104, 106, 108, 112, 114, 116, 118, and 120) is to fasten cylinder head 802 to unmodified engine block 100 once alignment has been achieved via alignment bushings 132 depicted in FIG. 1a.

Referring to FIG. 1a, depicted is a sectional view of a tapped hole with alignment bushing 130; this figure provides details regarding tapped holes with alignment bushings 102, 110 depicted in FIG. 1. Tapped hole 130 possesses tapped hole size or diameter 140, and internal thread 136. The exemplary Northstar engine possesses an M11×1.5 dimension for internal thread 136.

The alignment pin, or alignment bushing 132 is a metallic component that is typically press-fit into the unthreaded portion of tapped hole 136a region of tapped holes 102, 110 depicted in FIG. 1. Protruding portion of alignment bushing 132 having an alignment bushing contact height 134, creates a protuberance that provides an aligning function between cylinder head 802 depicted in FIG. 8 and unmodified engine block 100 depicted in FIG. 1 when joined. Tapped hole with alignment bushing 130 possesses functional depth 138 wherein a portion is threaded as depicted by thread length 138a.

Referring to FIG. 1b, depicted is a sectional view of tapped hole 150; this figure is similar to the aforementioned tapped hole with alignment bushing 130 without the alignment bushing feature, i.e. alignment bushing 132. Sectional view 150 provides details regarding each of eight tapped holes 104, 106, 108, 112, 114, 116, 118, 120, located on one face of the engine block 100 depicted in FIG. 1. Sectional view 150 depicts a tapped hole having a tapped hole size or diameter 160, wherein the exemplary Northstar engine possesses an M11×1.5 type thread for unmodified internal thread 156. Sectional view additionally depicts functional depth of unmodified hole 158 where substantially the entire depth is threaded with unmodified internal thread 156.

FIGS. 1a and 1b, in the present example, both possess the same M11×1.5 type thread for depicting unmodified internal thread 136, and unmodified internal thread 156, respectively. At this point, the basic properties of these closely related threaded holes, whose function is to couple with M11×1.5 type bolts, will be reviewed. An ISO-Metric, M11×1.5 type thread possesses a nominal diameter of 11 mm (0.4331 inch) and a pitch (P) of 1.5 mm (0.0591 inch). For the ISO-Metric thread form, as well as the UNF and UNC thread forms, the actual thread depth (d) is determined by the relationship given by: d=0.541266×P. Therefore, the actual thread depth (d) for an M11×1.5 type thread is 0.8119 mm (0.0320 inches). These particular fastener attributes have been linked, at least in part, to cylinder head 802 failure on the General Motors Northstar engine depicted as engine block 100 depicted in FIG. 1. One of the primary enablers for such a failure, in combination with said fastener attributes, is engine block 100 being fabricated from a light weight aluminum alloy.

The following table is included to summarize the thread depth advantage associated with exemplary thread type upgrades.

|  | Starting Tread | Modified Thread | % increase in Thread depth (d) |
| --- | --- | --- | --- |
| Thread Type (Thread depth d) | M11 × 1.5 (0.0320 inches) | ⅝ × 11 UNC (0.0492 inches) | 53.8% |
| Thread Type (Thread depth d) | 7/16 × 20 UNF (0.0271 inches) | ⅝ × 11 UNC (0.0492 inches) | 81.8% |

The original ISO-Metric, M11×1.5 type bolts (not shown) installed in the Northstar engine, depicted as engine block 100, have been known to break free from representative block 100, thereby causing cylinder head 802 failure, sealing issues and the like. Examination of the failed original ISO-Metric, M11×1.5 type bolts and unmodified internal threads 136 and 156 has revealed that the failure is primarily due to aluminum thread deterioration associated with engine block 100. Although the failure mode is not fully understood, reasonable explanations have been suggested.

NASA Reference Publication 1228 entitled "Fastener Design manual" authored by Richard T. Barrett of the Lewis Research Center of Cleveland, Ohio offers plausible explanations. An excerpt from page 5 teaches the following:

Galvanic Corrosion:

Galvanic corrosion is set up when two dissimilar metals are in the presence of an electrolyte, such as moisture. A galvanic cell is created and the most active (anode) of the two materials is eroded and deposited on the least active (cathode). Note that the farther apart two materials are in the following list, the greater the galvanic action between them.

According to reference 2 the galvanic ranking of some common engineering materials are as follows:

(1) Magnesium (most active)
(2) Magnesium alloys
(3) Zinc
(4) Aluminum 5056
(5) Aluminum 5052
(6) Aluminum 1100
(7) Cadmium
(8) Aluminum 2024
(9) Aluminum 7075
(10) Mild steel
(11) Cast iron
(35) Graphite
(36) Gold (least active)

Stress Corrosion:

Stress corrosion occurs when a tensile-stressed part is placed in a corrosive environment. An otherwise ductile part will fail at a stress much lower than its yield strength because of surface imperfections (usually pits or cracks) created by the corrosive environment. In general, the higher the heat-treating temperature of the material (and the lower the ductility), the more susceptible it is to stress corrosion cracking.

A significant amount of aluminum metal and corrosion byproducts have been detected on the threads of Northstar original ISO-Metric, M11×1.5 type bolts that have experienced cylinder head 802, depicted in FIG. 8, related type failures. According to Barrett's disclosure, this observation supports the suggestion of galvanic corrosion, since it is expected that the anode (aluminum block in this case) will deposit on the cathode (the iron based M11×1.5 type bolts). It is understood that this type of corrosion proceeds in a progressive manner. The corrosion is initiated at the dissimilar metal interface, and as the aluminum threads deteriorate from the thinner thread edge inward, the load remaining on the remaining thread material increases until a shear failure of the aluminum material occurs. The relatively high operating temperatures of automobile engines (195 to 276 deg.), as well as the associated thermal cycling create an additional stressor that exacerbates the situation. Taking an alternative point of view, as the corrosion progresses, the bolt pullout force from engine block 100 progressively decreases until shear failure occurs at the point where the remaining aluminum metal contained in the diminishing threads can no longer support the applied load. Pullout force (P) associated with a tapped hole is determined by the relationship (also provided by the aforementioned NASA Reference Publication 1228) is given by the following equation:

$$P = \frac{\pi dm F s L}{3}$$

Where
P Pullout force, lbs
dm mean diameter of threaded hole, in
Fs material ultimate or yield shear stress
L length of thread engagement, in
⅓ the factor introduces an additional margin of safety term to allow for mismatched threads, in a perfectly mated situation the factor would be ½.

An analysis of the aforementioned relationships reveals that the reliability of the fastening system associated with cylinder head 802 to engine block 100 can be increased;

cylinder head 802 failures are pushed out in time or eliminated by the implementation of various fixes or methods including:

1. Increasing the diameter, major diameter, or dm (diameter) defined in the previous equation of tapped hole size 140 and 160 of FIGS. 1a and 1b respectively. Such a modification will increase the thread engagement (surface area) of the fastening interface, thereby considerably lengthening the time to shear, pull-out, or letting-go type of failures by initially starting out with a larger pullout force (P) value. An alternative perspective teaches that the induced tensile load is shared by a larger fastening interface.
2. Increasing the thread depth, actual thread depth (d), or the like. The fastener-hole illustration of FIG. 5 depicts an exemplary thread depth attribute given by thread height (H) 508. Such an alteration will not only increase the fastener thread engagement, but also increase thread penetration into the tapped hole fastening interface. A longer thread height, given a set corrosion rate that is directional in nature (outer surface to inner bulk), will lengthen the time required to reach fastening interface failure. This is primarily due to the larger volume of fastening material that must go through the corroding process combined with the longer corrosion travel path.
3. Utilizing an electrically insulating finish on the surface of the fastener, the tapped hole, or any combination thereof to isolate the dissimilar metals to prevent or reduce the onset of galvanic corrosion. There are numerous methods and materials to create insulative coatings or thin films to accomplish such a task. For example, aluminum anodizing, the use of primers, oxides, and ceramic coatings (e.g. titanium nitride), as well as the use of certain thread locking materials that possess adhesive type properties as well as insulating properties can also provide a benefit. Additionally, durable dry film lubricants such as EMRALON 330 (available through Acheson-Henkel Company of 32100 Stephenson Highway, Madison Heights, Mich. 48071, and the like, can be used to provide the electrical insulation as well as provide a dry, clean, permanently lubricated surface to assist in installation and subsequent engine overhauls where disassembly may be required.

Figure 2:
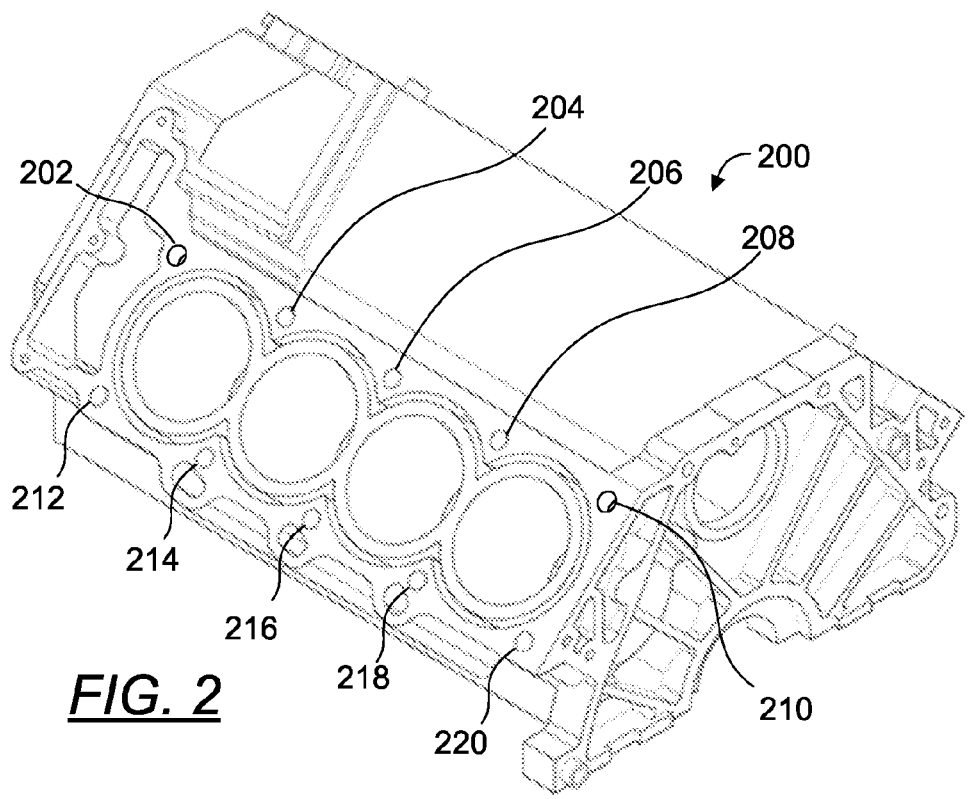
FIG. 2 illustrates a top perspective view of an exemplary modified engine block in accordance with one embodiment of the present invention.

Referring to FIG. 2, depicted is modified engine block 200. Modified engine block 200 is an upgraded version of unmodified engine block 100 upgraded to accept improved stud fasteners 300 and stud-alignment fasteners 400 depicted in FIG. 3 and FIG. 4 respectively. The basic process or steps required for engine block hole modifications are known in the art. Alternatively, FIG. 6b illustrates a perspective view of an exemplary combination aligning plate along with supporting components comprising an installation kit; the illustration depicts component use/utility directed to engine block face 620, depicted in FIG. 6b, modification leading to improved stud fastener adaptation and installation.

Modified engine block 200 possesses two tapped-alignment holes 202, 210, and eight modified tapped holes 204, 206, 208, 212, 214, 216, 218, 220. All of the aforementioned hole counterparts are also present on the opposing side or mirror-image cylinder face of modified engine block 200 of FIG. 2.

Figure 2A:
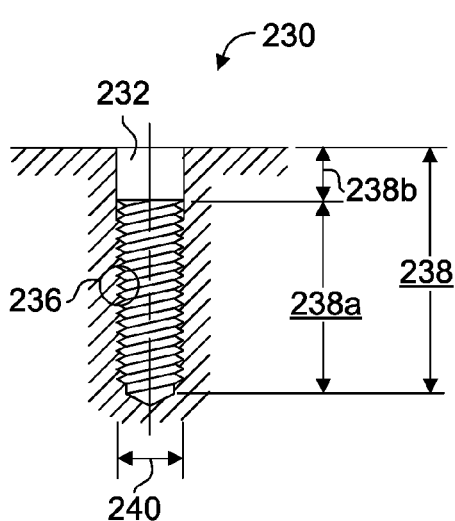
FIG. 2a illustrates a sectional side view of a tapped hole with alignment bushing receiving feature contained within a modified engine block in accordance with one embodiment of the present invention.
Figure 4:
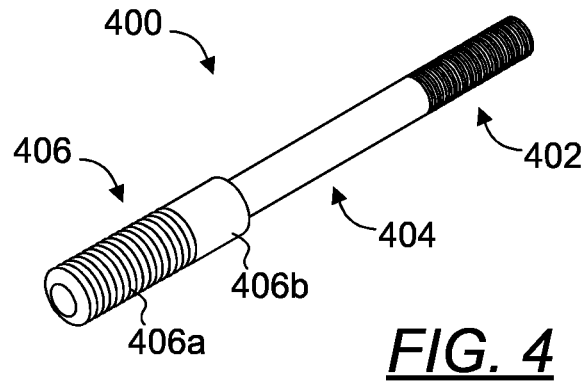
FIG. 4 illustrates a top perspective view of an exemplary improved stud fastener having an integrated cylinder head aligning feature in accordance with one embodiment of the present invention.

Tapped-alignment holes 202, 210, are designed to accept stud-alignment fasteners 400 depicted in FIG. 4, having a cylinder head-alignment feature 406b configured to occupy a portion of unthreaded internal area 232 shown in FIG. 2a. When the fastener is installed, cylinder head-alignment feature 406b provides a cylindrical projection, thereby providing a similar function once provided by alignment bushing 132 depicted in FIG. 1a. When installing cylinder head 802 of FIG. 8 or the like, the cylinder head-alignment feature 406b first mates with corresponding mating-alignment features located on cylinder head 802 to ensure proper alignment. The inclusion or integration of such an alignment feature into a stud fastener is novel and included in the present invention.

Figure 3:
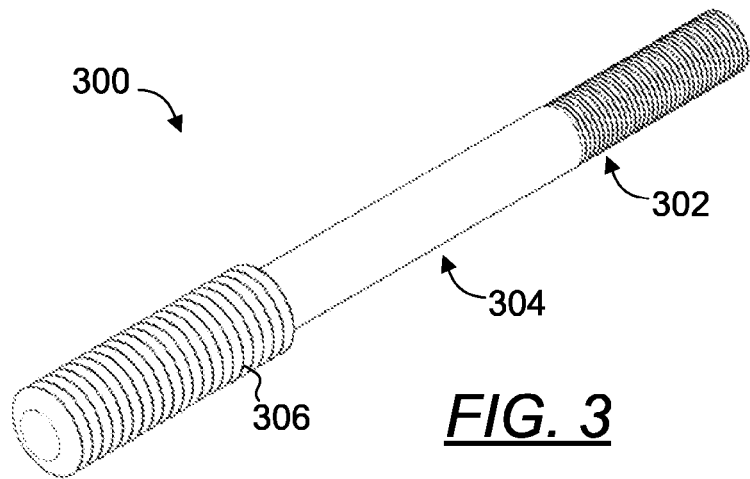
FIG. 3 illustrates a top perspective view of an exemplary improved stud fastener system in accordance with one embodiment of the present invention.

The aforementioned eight modified tapped holes 204, 206, 208, 212, 214, 216, 218, 220 are designed to accept stud fastener 300 of FIG. 3, whose function is to provide a reliable means for fastening cylinder head 802 to modified engine block 200. Fastening cylinder head 802 to modified engine block 200 final affixing via cylinder head washers 704 and cylinder head nuts 706 can commence once alignment has been achieved via installed stud-alignment fasteners 400 possessing cylinder head-alignment feature 406b. The aforementioned components, arranged in proper spatial alignment, are best depicted in FIG. 8.

FIG. 2a illustrates modified tapped-alignment hole sectional view 230, more specifically, the details pertaining to tapped-alignment holes 202, 210. Modified tapped-alignment hole 230 possesses a functional depth 238 wherein a portion is threaded as depicted by thread length 238a. Tapped-alignment hole 230 possess a modified tapped hole size 240, wherein the modified internal thread 236 has been upgraded from the original Northstar M11×1.5 type thread to a larger, more beneficial, ⅝×11 UNC thread type that possesses a larger diameter and coarser thread, that is, fewer threads per unit length coinciding with a larger or deeper thread depth. Increases in diameter, thread depth, or any combination thereof, are aforementioned features providing life extension benefits.

Figure 2B:
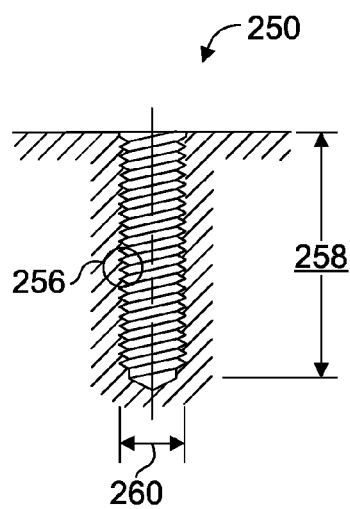
FIG. 2b illustrates a sectional side view of a tapped hole contained within a modified engine block in accordance with one embodiment of the present invention.

Referring to FIG. 2b, depicted is a sectional view of modified tapped hole 250; this figure is similar to the aforementioned modified tapped-alignment hole 230 without the alignment feature provided by unthreaded internal area 232. This Figure provides details pertaining to each of the eight tapped holes 204, 206, 208, 212, 214, 216, 218, 220, depicted on visible face or side of the engine block 200. Modified tapped hole 250 possess a modified tapped hole size 260, wherein the present embodiment is a ⅝×11 UNC thread type, converted from the original Northstar engine's M11×1.5 type thread. Sectional view of modified tapped hole 250 depicts functional depth of modified hole 258 where substantially the entire hole depth is threaded with modified internal thread 256.

FIG. 3 depicts a perspective view of stud fastener 300. The fastener in preferred embodiments is constructed, or machined from a single piece of metallic material having a generally rod like geometry. The finished stud fastener 300 possesses a first end, or cylinder head end 302 having a first diameter 318a, a second end, or engine block end 306 possessing a second diameter 314a.

Additionally, stud fastener 300 contains a midsection 304, having a midsection diameter 316. Midsection 304 connects first end 302 to second end 306.

Figure 3A:
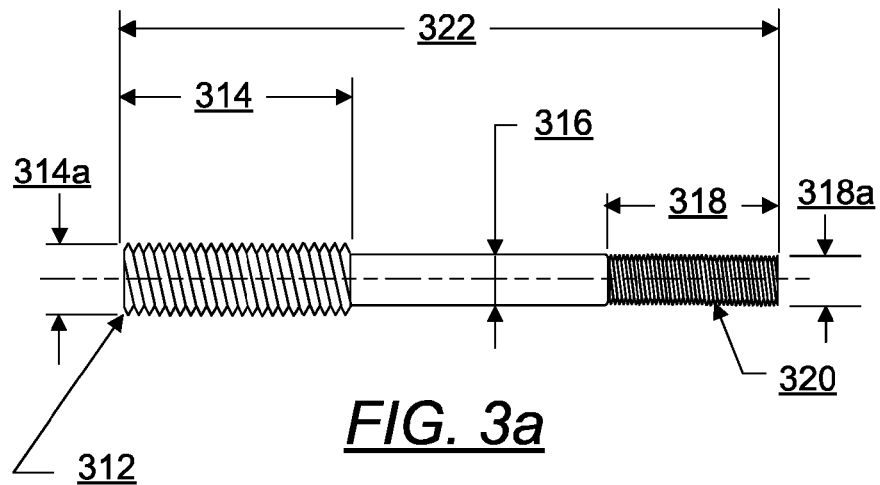
FIG. 3a illustrates a sectional front view of an exemplary improved stud fastener system in accordance with the embodiment depicted in FIG. 3.

Referring to FIG. 3a, depicted is a front view of stud fastener 300 having overall length 322. First end 302 has a first threaded feature 320 having a threaded feature length 318, and a second end 306 having a second threaded feature 312 having threaded feature length 314. Exemplary dimensions configured for use with a General Motors Northstar engine include: second threaded feature 312, having a preferred thread type of ⅝×11 UNC; second threaded feature length 314, having a preferred dimension of 2.0 inches; second diameter 314a, having a preferred dimension of ⅝ inches; midsection diameter 316 having a preferred dimension of 0.43 inches; first threaded feature length 318, having a preferred dimension of 1.50 inches; first diameter 318a, having a preferred dimension of 7/16 inches; first threaded feature 320, having a preferred thread type of 7/16×20 UNF; overall length 322, having a preferred dimension of 6.13 inches.

Figure 3B:
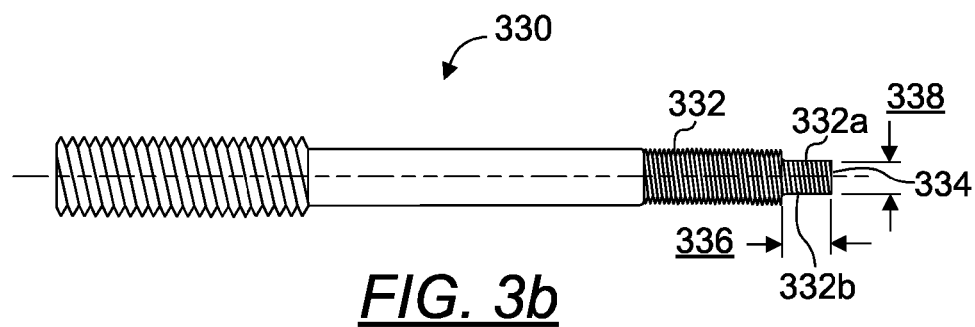
FIG. 3b illustrates a sectional front view of an exemplary improved stud fastener having a non-continuous threaded section in accordance with one embodiment of the present invention.

FIG. 3b depicts a front view of stud fastener with tool interface 330 having a non-continuous threaded section 334 located at the extreme end or distal portion of first end 332. The non-continuous threaded section 334 is comprised of a first flat feature 332a having a length 336. Preferably in a parallel plane, a distance 338 from first flat feature 332a, resides opposing second flat feature 332b having a length 336. Exemplary dimensions configured for use with a General Motors Northstar engine include: first and second flat feature length, having a preferred dimension of 0.38 inches; second threaded feature length 314, having a preferred dimension of 2.0 inches; distance from first to second flat feature 338, having a preferred dimension of 0.25 inches.

Embodiments possessing a non-continuous threaded section 334, or like features, enables the use of common tools, such as a wrench, to aid in the screw-in installation of stud fastener 330 into modified engine block 200. Installation tools function by simultaneously engaging first flat feature 332a and opposing second flat feature 332b thereby capturing non-continuous threaded section 334 of stud fastener 330. Flat features 332a, 332b are disposed at the extreme or distal end of first end 332 so to not compromise the strength of the installed stud. Non-continuous threaded section 334 is disposed on a portion of the fastening device that does not experience the fastening, or torque-down stresses associated with securing cylinder head 802 to modified engine block 200. In preferred embodiments, final seating of the cylinder head nuts 706 avoids the potentially strength compromised non-continuous threaded section 334; This results in the cylinder head nuts 706 residing completely on continuously threaded section in the final state of installation.

FIG. 4, depicts a perspective view of stud-alignment fastener 400. The fastener in preferred embodiments is constructed, or machined from a single piece of metallic material. The stud-alignment fastener 400 possesses a first end, or cylinder head end 402 possessing a first diameter 418a, a second end, or engine block end 406 having a length 414 possessing a threaded portion 406a having a threaded second diameter 412a and a non-threaded portion 406b having a non-threaded diameter 406c. Additionally, stud-alignment fastener 400 has a midsection 404, possessing a midsection diameter 416. Midsection 404 connects first end 402 to second end 406.

Figure 4A:
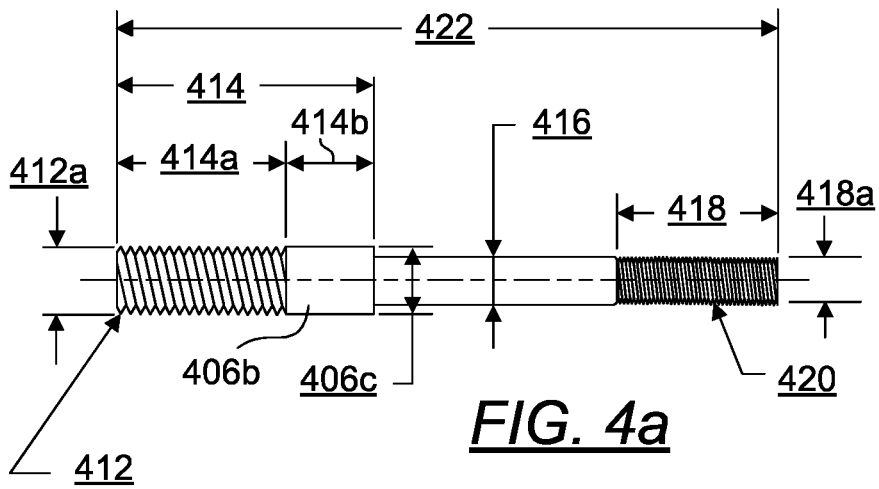
FIG. 4a illustrates a sectional front view of an exemplary improved stud fastener having an integrated cylinder head aligning feature in accordance with the embodiment depicted in FIG. 4.

FIG. 4a, depicted is a front view of stud-alignment fastener 400 having overall length 422. First end 402 has a first threaded feature 420 having a length 418, and a second end 406 having a threaded portion 406a with threaded portion length 414a and non-threaded portion 406b with a non-threaded portion length 414b.

Exemplary dimensions configured for use with a General Motors Northstar engine include: non-threaded second diameter 406c, having a preferred dimension of 0.62 inches; second threaded feature 412, having a preferred thread type of 5/8×11 UNC; second end length 414, having a preferred dimension of 2.38 inches; threaded portion length (second end) 414a, having a preferred dimension of 1.56 inches; threaded second diameter 412a, having a preferred dimension of 5/8 inches; midsection diameter 416, having a preferred dimension of 0.43 inches; first threaded feature length 418, having a preferred dimension of 1.50 inches; first diameter 418a, having a preferred dimension of 7/16 inches; first threaded feature 420, having a preferred thread type of 7/16×20 UNF; stud-alignment fastener overall length 422, having a preferred dimension of 6.13 inches.

Figure 4B:
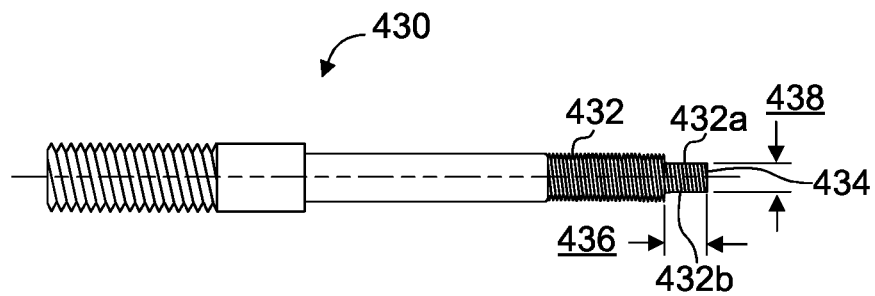
FIG. 4b illustrates a sectional front view of an exemplary improved stud fastener having an integrated cylinder head aligning feature and a non-continuous threaded section in accordance with one embodiment of the present invention.

FIG. 4b illustrates a front view of stud fastener with tool interface 430, depicting a first end 432 possessing a first flat feature 432a at one end, and an opposing second flat feature 432b thereby forming a non-continuous threaded section 434. This embodiment enables the use of common tools, for example a wrench, or the like, to engage with first flat feature 432a and opposing second flat feature 432b thereby assisting a user in the installation of stud fastener with tool interface 430 into tapped-alignment holes 202 and 210 of modified engine block 200. Flat features 432a, 432b are disposed at the extreme or distal end of first end 432 so to not create an area of compromised strength once the device is fully installed. Non-continuous threaded section 434, in a preferred installation embodiment, is located outside the portion of stud 130 that experiences the fastening stresses associated with securing cylinder head 802 to modified engine block 200. The potentially strength compromised non-continuous threaded section 434 is bypassed, or avoided by cylinder head nuts 706 in the final state of installation. Exemplary dimensions configured for use with a General Motors Northstar engine include: first and second flat feature length 436, having a preferred dimension of 0.38 inches; distance from first to second flat feature 438, having a preferred dimension of 0.25 inches.

The immediate section is directed to the topic of material selection discussion regarding stud fastener 300 and stud-alignment fastener 400. Both stud fastener 300 and stud-alignment fastener 400 are preferably fabricated from a metal or metal alloy that is capable of withstanding the stresses associated with the specified predetermined fastener torque for a given engine application given the range of engine operating temperatures. Examples of metallic materials include selections from the family of stainless steel, chrome-moly, Inconel, titanium, their alloys, and the like. Focusing on steel, fabrication from grade 8 steel has produced structurally sound fasteners, whereas fasteners fabricated from grade 5 steel resulted thread stripping, and therefore should be avoided. Preferred embodiments include the use of high tensile or high strength steel or alloys thereof, capable of withstanding normal engine temperatures (195 to 276 deg.).

Referring to FIG. 5, depicted is a sectional view of a detail of a threaded fastening/fastener interface 500. The depiction assists in the understanding of threaded interfaces and provides a geometrical reference to defining nomenclature. Fastening/fastener interface 500 is comprised of bolt 501b coupled with tapped hole 501a. Other depicted features include: major diameter (Dmaj) 502, effective pitch diameter (Dp) 504, minor diameter (Dmin) 506, thread height (H) 508, dimensional length 5 H/8 represented by feature 510, dimensional length H/4 represented by feature 512, dimensional length H/8 represented by feature 514, dimensional length 3 H/8 represented by feature 516. The dimensional length 5 H/8 represented by feature 510 is also referred to as the actual thread depth; the actual thread depth corresponds to the actual geometrical engagement between tapped hole 501a and bolt 501b.

Figure 6:
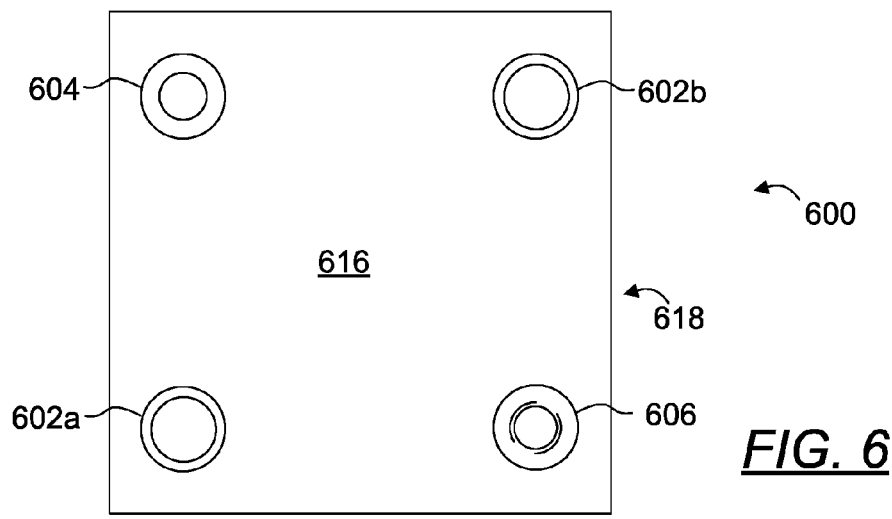
FIG. 6 illustrates a sectional front view of an exemplary multifunctional plate, combination aligning plate, combo jig, or combo plate.

Referring to FIG. 6, depicted is a front view 616 of combination aligning plate or combo plate 600, having a feature corresponding back face 618 (not shown). Combo plate 600 is comprised of two mounting holes 602a and 602b, one drill bit alignment hole 604, and one tap alignment hole 606.

Figure 6A:
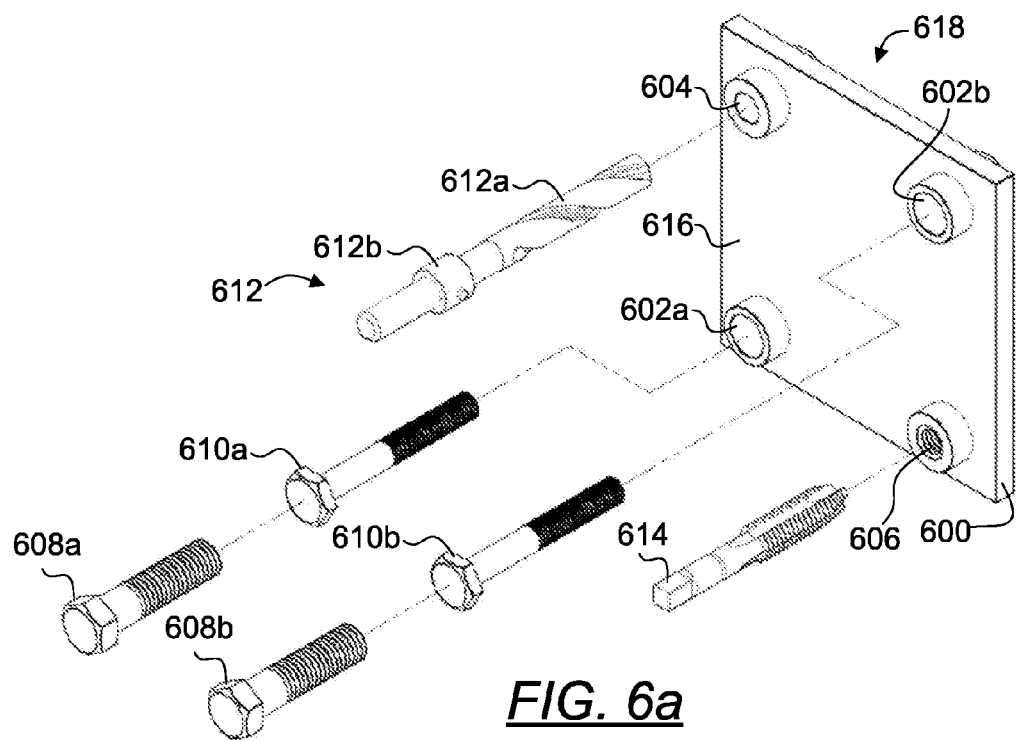
FIG. 6a illustrates a perspective view of an exemplary combination aligning plate and components directly associated with use of the alignment plate.
Figure 6B:
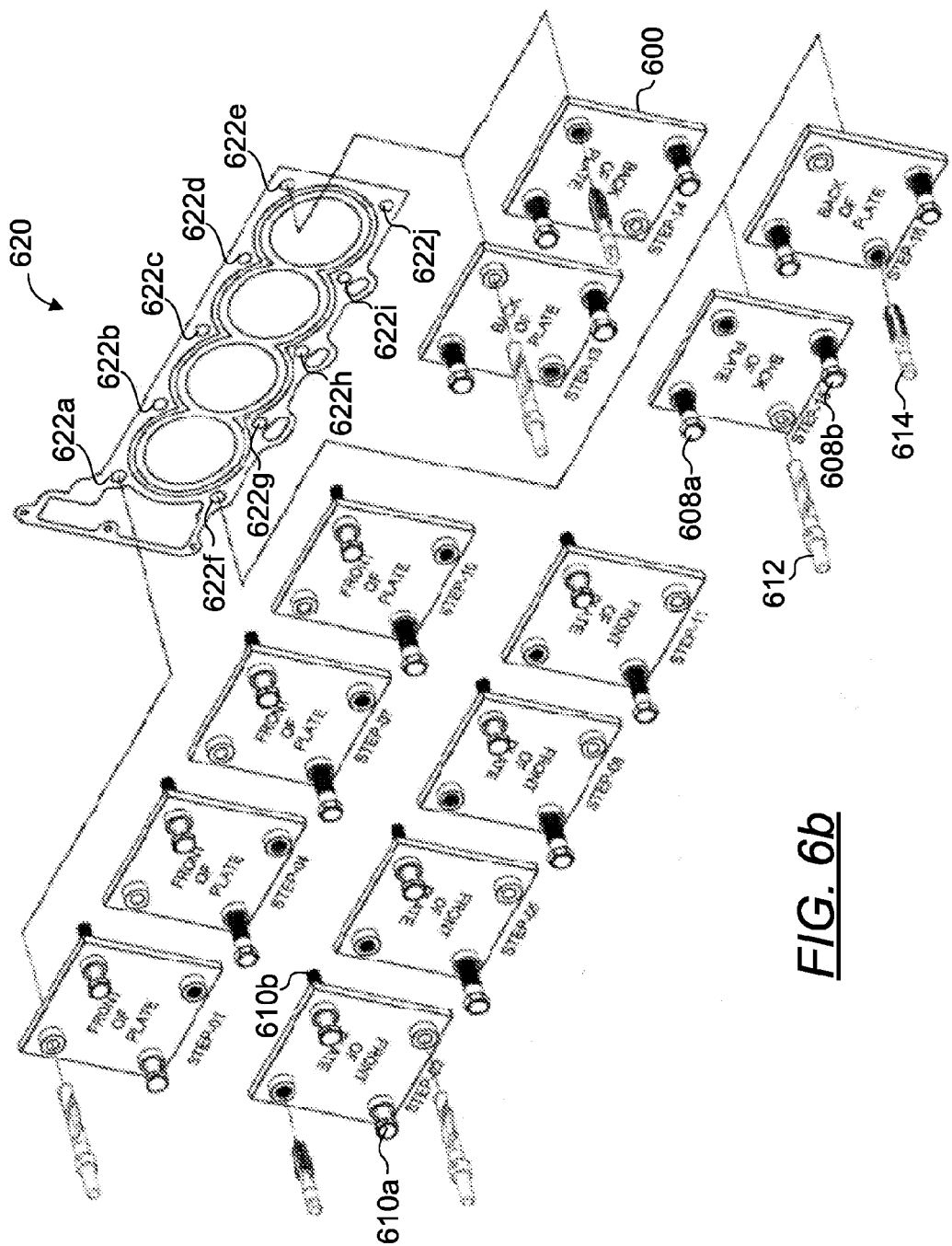
FIG. 6b illustrates a perspective view of exemplary combination aligning plate use/utility and components directly associated with use of the alignment plate as directed to an engine block face.

FIG. 6a depicts mounting holes 602a and 602b wherein the dual hole set is capable of accepting any combination of modified tapped hole bolts 608a, 608b, or unmodified tapped hole bolt 610a, 610b, such that combo plate 600 is capable of being securely fastened to any set of four engine block tapped holes 622a through 622j (shown in FIG. 6b). Note that holes 622a through 622j will sequence through various combinations of original tapped and modified tapped holes as a user sequentially progresses in the retrofitting process. Additionally, combo plate 600 functions to provide a drilling and tapping guide so that corresponding processes receive substantially perpendicular support with respect to engine block face 620. The drilling process is accomplished using drill bit assembly 612, which is comprised of drill bit 612a, and drill bit collar 612b, wherein the function of drill bit collar 612b is to limit drilling depth. The tapping process is accomplished using tap 614, which engages with tap alignment hole 606 possessing a corresponding thread contained therein.

FIG. 6b depicts various combo plate 600 orientations and associated drill bit assembly 612, tap 614; and modified tapped hole bolts 608a, 608b, unmodified tapped hole bolt 610a, 610b fastener, combinations to mount onto the various engine block face 620 locations to enable the drill and tap process of engine block holes 622a through 622j. The basic process is comprised of an initial drilling step accomplished using drill bit assembly 612, followed by the tapping process utilizing tap 614.

Figure 6C:
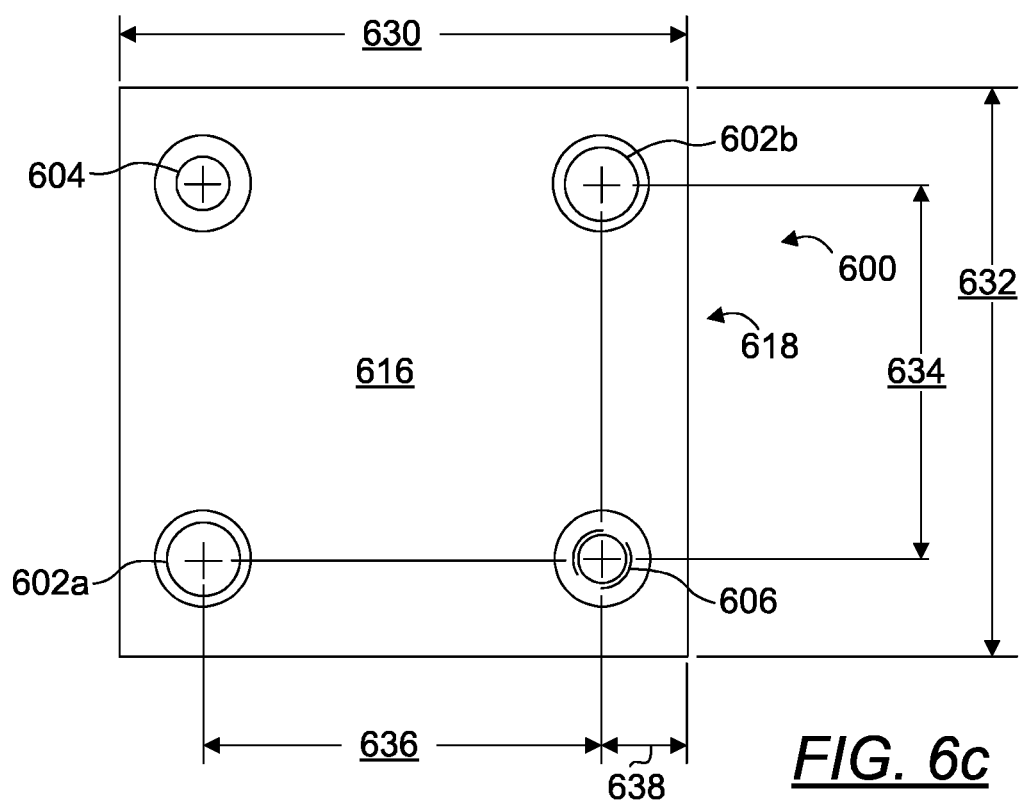
FIG. 6c illustrates a sectional front view of the combination aligning plate of FIG. 6 with exemplary dimensional details.

FIG. 6c depicts exemplary dimensional aspects of combination aligning plate 600, front face 616, configured for use with a General Motors Northstar engine, commonly used in their Cadillac line. Exemplary dimensions include: combination aligning plate width 630, having a preferred dimension of 6.0 inches; combination aligning plate height 632, also having a preferred dimension of 6.0 inches; distance between mounting hole 602b and tap alignment hole 606—feature number 634, having a preferred dimension of 4.3 inches; distance between mounting hole 602a and tap alignment hole 606—feature number 636, having a preferred dimension of 4.0 inches; distance between mounting hole 602b center and right plate edge feature number 638, having a preferred dimension of 1.0 inches.

Figure 6D:
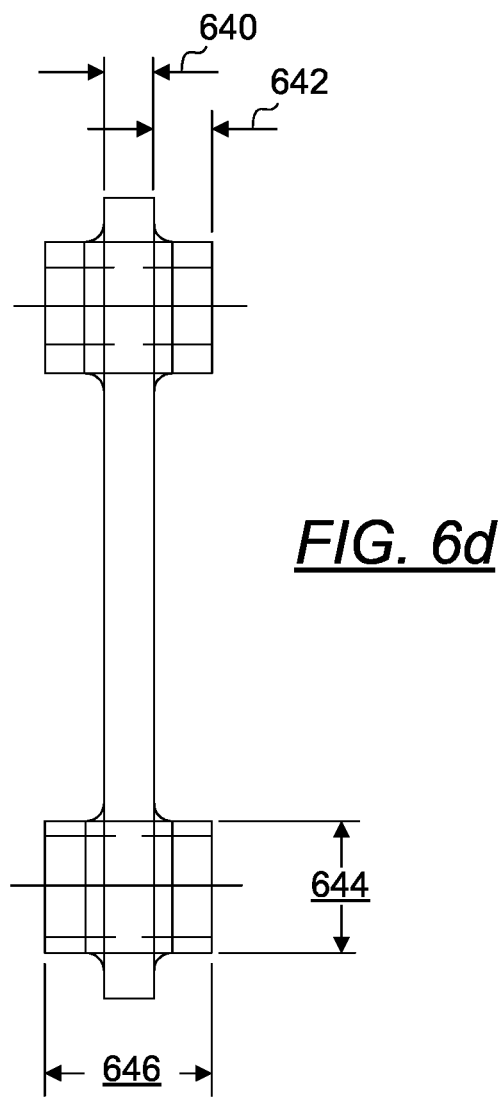
FIG. 6d illustrates a sectional side view of the combination aligning plate of FIG. 6 with exemplary dimensional details.

FIG. 6d depicts exemplary dimensional aspects of combination aligning plate 600, side view, configured for use with a General Motors Northstar engine, commonly used in their Cadillac line. Exemplary dimensions include: combination aligning plate thickness 640, having a preferred dimension of 0.38 inches; height of mounting hole 602b—feature number 642, having a preferred dimension of 0.43 inches; tap alignment hole 606 feature diameter 644, having a preferred dimension of 1.0 inches; tap alignment hole 606 feature end to end height 646, having a preferred dimension of 1.25 inches.

Figure 7:
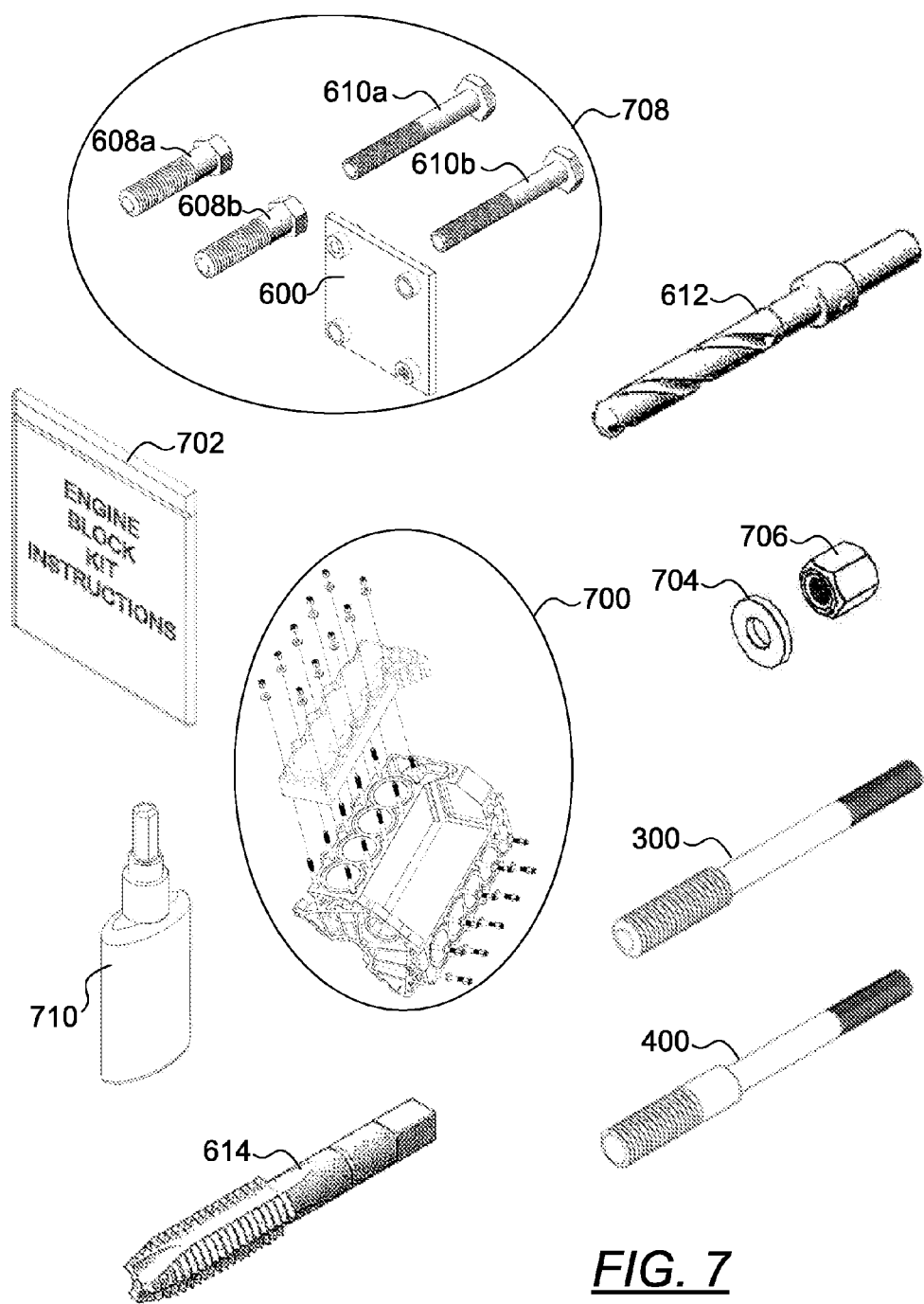
FIG. 7 illustrates a retrofitted engine surrounded by typical exemplary components that can comprise a cylinder head to engine block fastener installation or retrofit kit.

Referring to FIG. 7, depicted are various components that comprise a cylinder head to engine block fastener installation or retrofit kit. Included as part of the installation kit of FIG. 7, is combination aligning plate assemblage 708. The cylinder head to engine block fastener retrofit kit can be comprised from any combination of useful items associated with the installation or retrofit process, including:

kit instructions or directions 702, which is comprised from written directions, CD based directions, flash drive containing directions, dedicated website or webpage, or any combination thereof.

cylinder head washers 704, washers are placed between the cylinder head nuts 706 and cylinder head 802. An example of acceptable washers is case hardened steel 7/16 flat washer with black oxide finish available from the Fastenal Company, part number 302705-130481.

cylinder head nuts 706, these nuts are used in conjunction with fastener 300, 400 or embodiments thereof, and fastened over cylinder head washers 704. A typical nut or nuts are fabricated from grade 8 steel.

Exemplary nuts are available from the Fastenal Company, part number 37889.

stud fastener 300, and/or 330 stud-alignment fastener 400, and/or 430 drill bit assembly 612, comprised of drill bit 612a and drill bit collar 612b; an example of acceptable drill bit is the Silver & Deming 17/32 bit, available through the Fastenal Company, part number 0316236. Drill bit stop collars are commonly available and function to limit hole drilling to a predetermined depth.

Tap bit; an example of acceptable tapping bit is the 5/8×11, available from the Fastenal Company, part number 0326680.

combination aligning plate assemblage 708, the assemblage, or kit is comprised of combination aligning plate, combo jig, or combo plate 600, including modified tapped hole bolts 608a, 608b, and unmodified tapped hole bolts 610a, 610b. Modified tapped hole bolts 608a, 608b are 5/8×11 type bolts, whose length are 2.5 inches, and available through the Fastenal Company, part number 110120419. The unmodified tapped hole bolts 610a, 610b are available via custom machining; specifications include M11×1.5 thread type with a length of about 3.350 inches, and hexagonal head is a minimum of about 2.4 cm from flat to flat.

Thread locking fluid 710, an example of acceptable thread locking product includes Vibra-tite threadlocker 13150, available through ND Industries of 1893 Barrett Dr, Troy Mich. 48084, or LOCTITE 262 threadlocker available through Henkel Industries of 32100 Stephenson Highway, Madison Heights, Mich. 48071.

FIG. 8 illustrates a perspective exploded view of retrofitted engine 800 showing cylinder head, or engine cover 802. Additionally illustrated are improved studs and associated fastening components in spatial alignment.

Figure 8A:
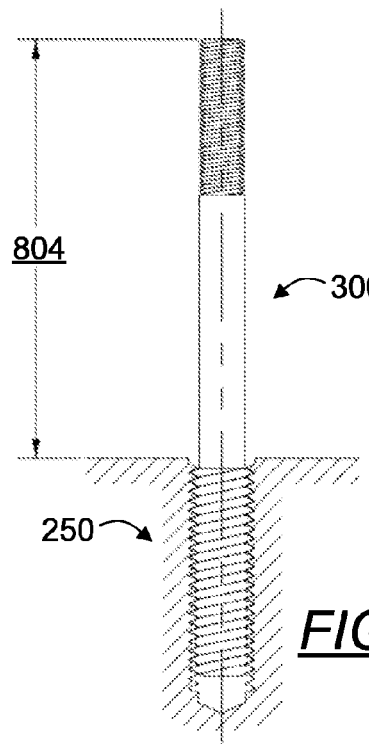
FIG. 8a illustrates a sectional front view of a stud fastener mounted in an engine block modified tapped hole.

FIG. 8a illustrates a sectional front view of stud fastener 300 mounted in an engine block modified tapped hole 250. Height of stud 300 above surface of engine block 200 is depicted by feature number 804.

Figure 8B:
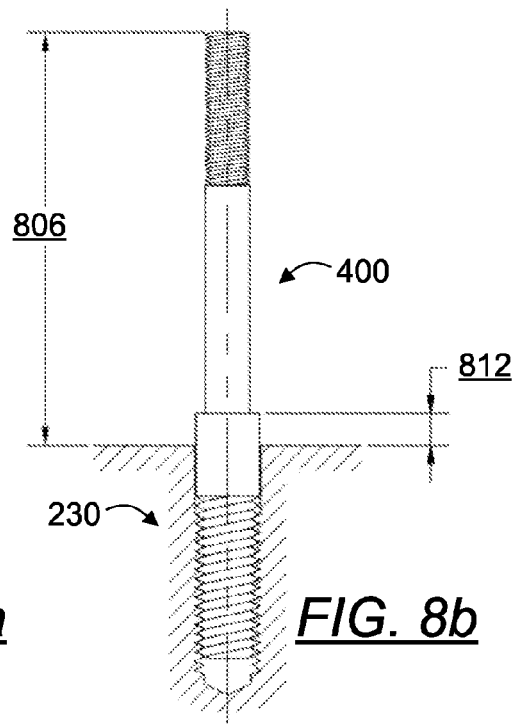
FIG. 8b illustrates a sectional front view of a stud-alignment fastener mounted in an engine block modified tapped-alignment hole.

FIG. 8b illustrates a sectional front view of stud-alignment fastener 400 mounted in an engine block modified tapped-alignment hole 230. Height of stud 400 above surface of engine block 200 is depicted by feature number 806. Stud 400 alignment feature height above engine block 200 surface is depicted by feature number 812.

Figure 8C:
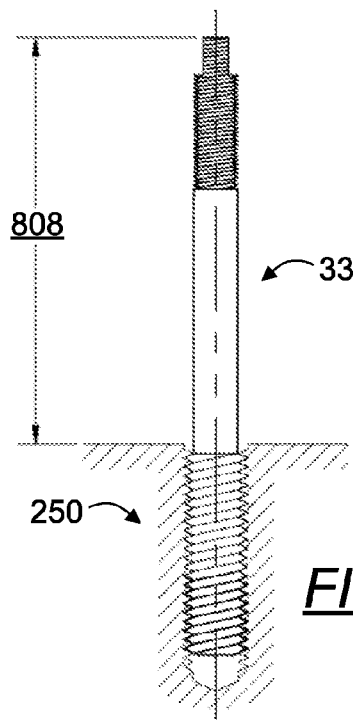
FIG. 8c illustrates a sectional front view of a stud fastener with tool interface mounted in an engine block modified tapped hole.

FIG. 8c illustrates a sectional front view of stud fastener with tool interface 330 mounted in an engine block modified tapped hole 250. Height of stud 330 above surface of engine block 200 is depicted by feature number 808.

Figure 8D:
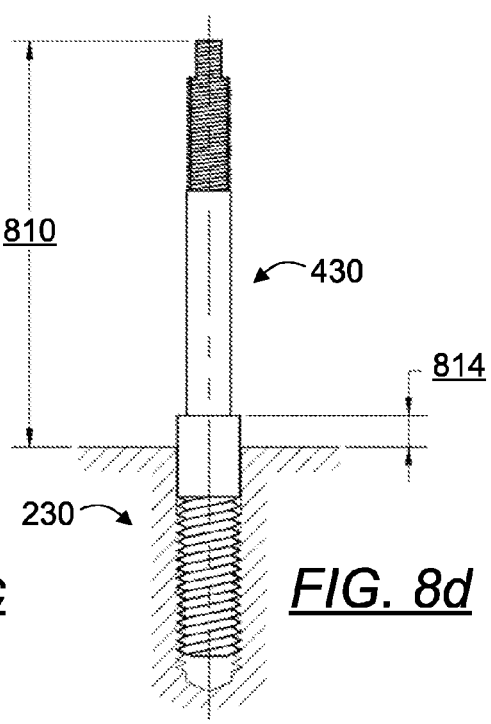
FIG. 8d illustrates a sectional front view of stud-alignment fastener with a tool interface mounted in an engine block modified tapped-alignment hole.

FIG. 8d illustrates a sectional front view of stud-alignment fastener with tool interface 430 mounted in an engine block modified tapped-alignment hole 230.

Height of stud 430 above surface of engine block 200 is depicted by feature number 810. Stud 430 alignment feature height above engine block 200 surface is depicted by feature number 814.

Additional Advantages and Summary of the Invention

One aspect of the invention is to repair a condition in the Cadillac Northstar engine where the threads in the cylinder head bolt holes corrode away over time, and strip. These cylinder head bolt holes are in the aluminum engine block. The original threads are too fine and it does not take much corrosion before the bolt will let go and lose its torque on the cylinder heads, thus causing head gasket failure, which these engines are very prone for due to this condition.

The repair method used by Cadillac technicians and others is to drill out the holes in the engine block using a guide plate, re-thread the block and install an insert sleeve that is threaded both internally and externally, and then to re-use the original style head bolts. This repair is also very prone to failure communications with a sample of Cadillac technicians reveal that 4 out of 5 of engines repaired in this manner will fail again in a short period of time. There are many other aluminum block engines that exhibit this problem and the same repair method is used on those engines as well. The only other option known is to replace the engine block.

One aspect of the present invention developed consists of drilling out the cylinder head bolt holes in the engine block to an even greater size inside diameter, specifically 17/32 of an inch, the entire depth of the hole. The hole is rethreaded with 5/8-11 UNC threads for the depth of 2.25 inches in each of the 20 holes.

A custom machined, dual-diameter cylinder head stud is used as the repair. The large end of this custom stud is threaded into the newly re-threaded cylinder head bolt holes until the first diameter is recessed below the block deck surface approximately 1/16 of an inch. Left exposed and standing up 4 1/8 inches above the block deck surface (different lengths on year model 2000 and up Northstar engines), is the smaller diameter of the stud, having a 7/16 inch diameter. The stud now acts as the original cylinder head bolts. The cylinder head gasket is slid over the studs, followed by the cylinder head, and then it is fastened down and torqued following the factory sequence guidelines to 75 ft. Lbs., using hardened flat washers and 7/16 inch inside diameter fine thread nuts that are taller than average, with an internal thread count of 20 threads per inch. Summary advantages of the present invention include:

1. The threads in the block are much larger and much coarser than the original, which will ensure it will take more time before the dissimilar metals will cause enough corrosion to allow the stud to break free or "let go".
2. The cylinder heads can now be sequentially torqued from on top using the nuts, which helps to ensure torque accuracy as well as providing a gentle interaction with the engine block. In an engine system where studs are not used, the original bolts must rotate or twist under torque into the aluminum engine block, thereby risking damage to the soft aluminum block engine threads. When using the improved studs of the present invention, the threaded studs are fully engaged into the aluminum engine block before torquing or the fastening process starts, furthermore, stud threads located in the aluminum engine block do not rotate, thereby minimizing the risk of engine block thread damage.
3. Due to their length and one piece design, the improved studs are easier and less time consuming to install than the commonly used threaded sleeve type insert systems, this enables some individuals to install the improved studs into the engine block by hand.
4. The repair is a one-piece repair rather than a sleeve and the original style bolt. The stud will not exhibit any type of diameter expansion when torque is applied as the threaded sleeves often do, thus preventing the engine block from cracking or stripping the threads inside the threaded sleeve.

What is claimed herein is:

1. A stud having an overall length of about 6.13 inches, constructed from a single piece of metallic material, adapted for fastening a cylinder head to a General Motors Northstar engine block, comprising:
    a cylindrical rod having a first end having a first diameter, a second end having a second diameter, such that said second diameter is larger than said first diameter; and
    a midsection, having a midsection diameter of about 0.43 inches, connecting said first and second ends; each of said first end, second end, and midsection possessing a length, wherein said first end length is about 1.50 inches, and said second end length is about 2.0 inches, and
    said first end having a first threaded feature disposed about at least a portion of its said length such that said first end engages a cylinder head nut and provides adequate thread travel to enable fastening of said cylinder head to said engine block, and
    said second end having a second threaded feature disposed about the entirety of said length of said second end, such that said second threaded feature can be fully inserted into said engine block having a tapped hole with corresponding mating thread features.

2. The stud of claim 1 wherein said second threaded feature possesses a coarser thread than said first threaded feature such that actual thread depth of said second threaded feature is larger than thread depth of said first threaded feature.

3. The stud of claim 1, wherein said first end having a fastener interface possessing at least two opposing flat features disposed about said first diameter, such that said at least two opposing flat features are located in a low stress area when said stud is fully installed and providing an interface capable of cooperating engagement with a fastening tool to assist in the installment of said stud.

4. The stud of claim 1, wherein said midsection diameter is substantially smaller than said second end said diameter, wherein said midsection diameter permits said cylinder block to said engine block fastening.

5. The stud of claim 1, wherein said stud is constructed from a high temperature, high tensile strength steel.

6. The stud of claim 1, wherein said stud possesses a substantially durable electrically insulative coating such that said stud is substantially electrically isolated from said engine block thereby reducing the likelihood of creating a galvanic cell and its associated material deterioration.

7. A stud-alignment fastener having an overall length of about 6.13 inches, constructed from one piece of metallic material, configured for aligning and fastening a cylinder head to a General Motors Northstar engine block, comprising:
    a cylindrical rod having a first end having a first diameter, a second end having a second diameter such that said second diameter is larger than said first diameter; and
    a midsection having a midsection diameter of about 0.43 inches, connecting said first and second ends; each of said first end, second end, and midsection possessing a length, wherein said first end length is about 1.50 inches, and said second end length is about 2.38 inches, and
    said first end having a first threaded feature disposed about at least a portion of its said length such that said first end engages a cylinder head nut and provides adequate thread travel to enable fastening said cylinder head to said engine block, and
    said second end having a second threaded feature disposed about a predetermined portion of its said length wherein a remaining unthreaded portion provides an alignment feature for said cylinder head created by partial insertion of said second end into said engine block portion having a tapped alignment hole wherein said remaining unthreaded portion, protruding from said engine block, functions as an alignment feature, said second threaded feature having a threaded portion length of about 1.56 inches.

8. The stud-alignment fastener of claim 7, wherein said second threaded feature possesses a coarser thread than said first threaded feature such that actual thread depth of said second threaded feature is greater than actual thread depth of said first threaded feature.

9. The stud-alignment fastener of claim 7, wherein said first end possesses at least two opposing flat features disposed about said first diameter, such that said at least two opposing flat features are located in a low stress area when said stud is fully installed, said at least two opposing flat features providing an interface capable of cooperating engagement with a fastening tool to assist in the installment of said stud.

10. The stud-alignment fastener of claim 7, wherein said midsection diameter is substantially smaller than said second end said diameter, wherein said midsection diameter permits said cylinder block to said engine block fastening.

11. The stud-alignment fastener of claim 7, wherein said stud-alignment fastener is constructed from a high temperature high tensile strength steel.

12. The stud-alignment fastener of claim 7, wherein said stud-alignment fastener possesses a substantially durable electrically insulative coating such that said stud is substantially electrically isolated from said engine block thereby reducing the likelihood of creating a galvanic cell and its associated material deterioration.

13. A cylinder head to engine block fastener retrofit kit configured for a General Motors Northstar engine block, comprising:
   at least one stud, constructed from one piece of metallic material, for fastening a cylinder head to an engine block, comprising:
      a cylindrical rod having a first end having a first diameter, a second end having a second diameter, such that said second diameter is larger than said first diameter; and
      a midsection, having a midsection diameter of about 0.43 inches, connecting said first and second ends; each of said first end, second end, and midsection possessing a length, wherein said first end length is about 1.50 inches, and said second end length is about 2.0 inches, and
      said first end having a first threaded feature disposed about at least a portion of its said length such that said first end engages a cylinder head nut and provides adequate thread travel to enable fastening of said cylinder head to said engine block, and
      said second end having a second threaded feature disposed about the entirety of said length of said second end, such that said second threaded feature can be fully inserted into said engine block having a tapped hole with corresponding mating thread features.

14. The cylinder head to engine block fastener retrofit kit of claim 13, further comprising at least one stud-alignment fastener, constructed from one piece of metallic material, for aligning and fastening a cylinder head to an engine block, comprising:
   a cylindrical rod having a first end having a first diameter, a second end having a second diameter such that said second diameter is larger than said first diameter; and
   a midsection having a midsection diameter of about 0.43 inches, connecting said first and second ends; each of said first end, second end, and midsection possessing a length, wherein said first end length is about 1.50 inches, and said second end length is about 2.38 inches, and
   said first end having a first threaded feature disposed about at least a portion of its said length such that said first end engages a cylinder head nut and provides adequate thread travel to enable fastening said cylinder head to said engine block, and
   said second end having a second threaded feature disposed about a predetermined portion of its said length wherein a remaining unthreaded portion provides an alignment feature for said cylinder head created by partial insertion of said second end into said engine block portion having a tapped alignment hole wherein said remaining unthreaded portion, protruding from said engine block, functions as an alignment feature, said second threaded feature having a threaded portion length of about 1.56 inches.

15. The cylinder head to engine block fastener retrofit kit of claim 13, further comprising a combination aligning plate assemblage.

16. The cylinder head to engine block fastener retrofit kit of claim 13, further comprising a set of instructions.

17. The cylinder head to engine block fastener retrofit kit of claim 13, further comprising a tap and drill bit set having a drill bit locking collar.

18. The cylinder head to engine block fastener retrofit kit of claim 13, further comprising a container of thread locking material.

19. The cylinder head to engine block fastener retrofit kit of claim 13, further comprising at least one cylinder head flat washer.

20. The cylinder head to engine block fastener retrofit kit of claim 13, further comprising at least one cylinder head nut fastener.

* * * * *